Feb. 25, 1941.  S. B. WINN  2,232,897
TRACTOR TRAILER COUPLING MECHANISM
Filed Jan. 3, 1938  5 Sheets-Sheet 1
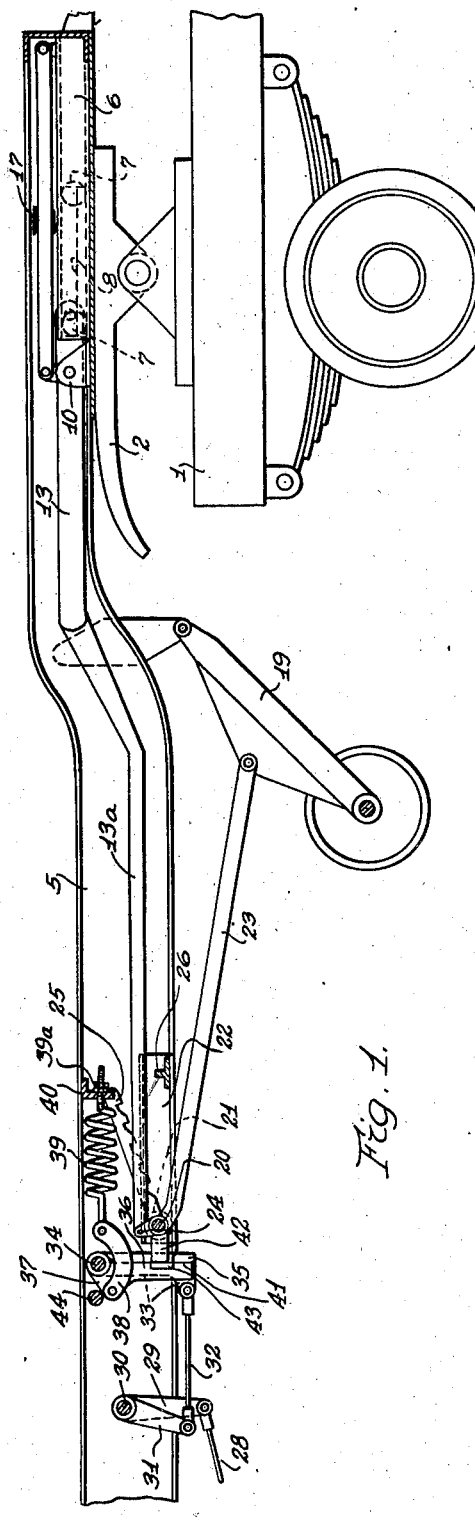
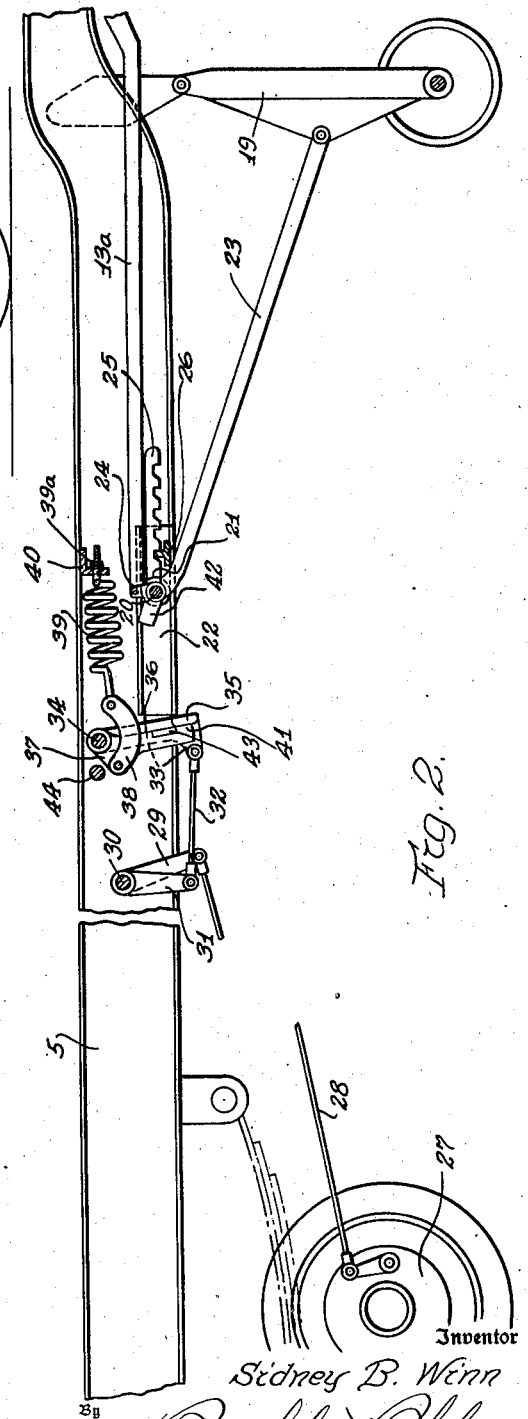
Inventor
Sidney B. Winn
Attorneys Feb. 25, 1941.    S. B. WINN    2,232,897
TRACTOR TRAILER COUPLING MECHANISM
Filed Jan. 3, 1938    5 Sheets-Sheet 2

Inventor
Sidney B. Winn
By
Attorneys

Feb. 25, 1941.  S. B. WINN  2,232,897
TRACTOR TRAILER COUPLING MECHANISM
Filed Jan. 3, 1938  5 Sheets-Sheet 3
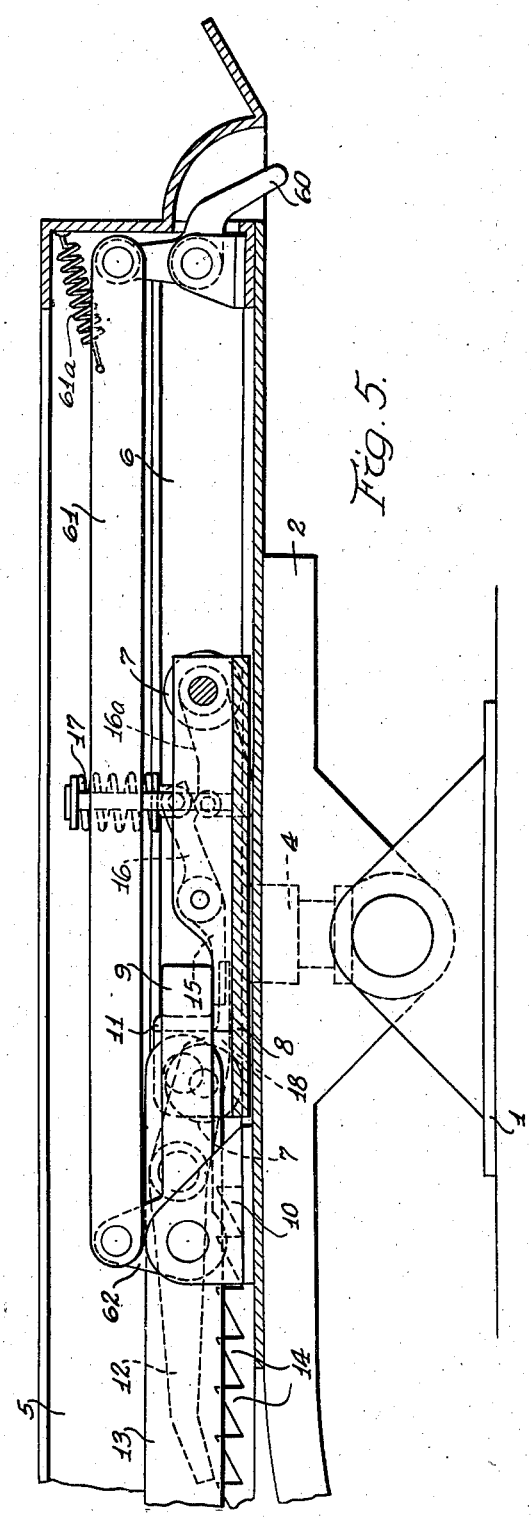
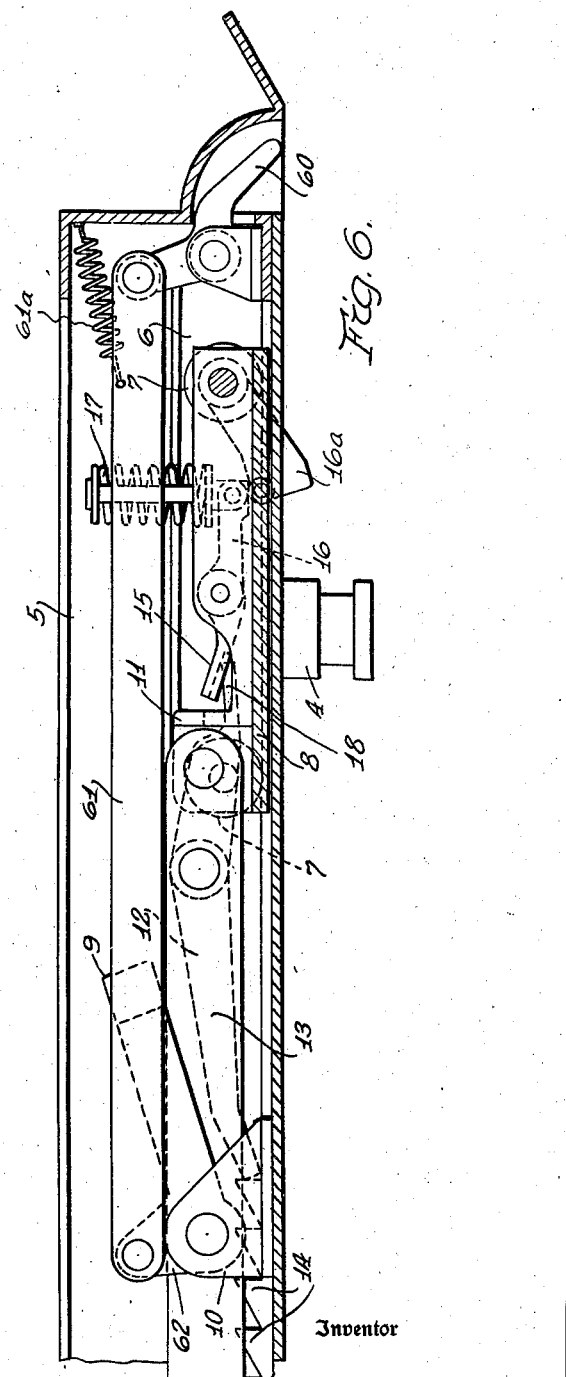
Inventor
Sidney B. Winn
Attorneys

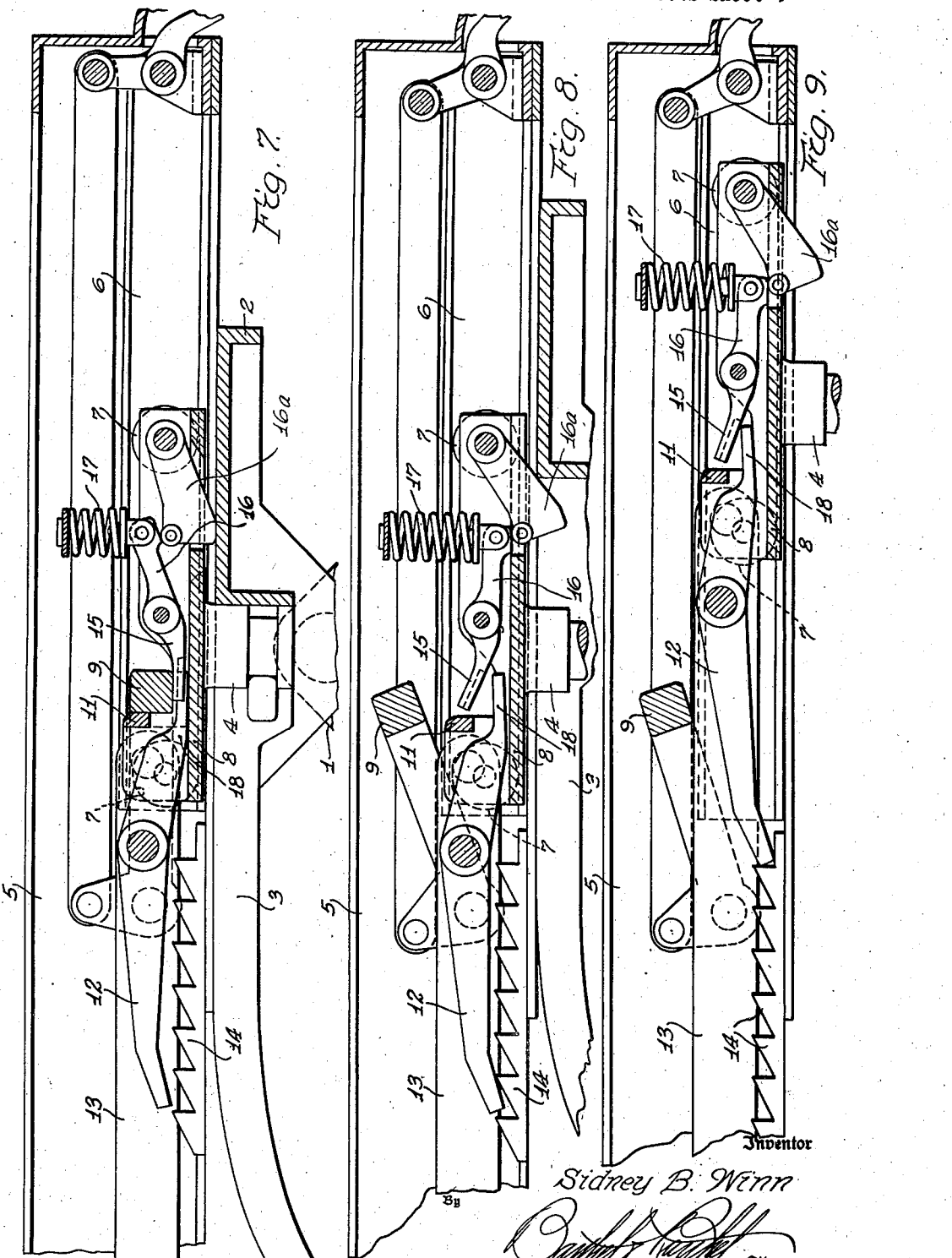

Feb. 25, 1941.  S. B. WINN  2,232,897
TRACTOR TRAILER COUPLING MECHANISM
Filed Jan. 3, 1938  5 Sheets-Sheet 5
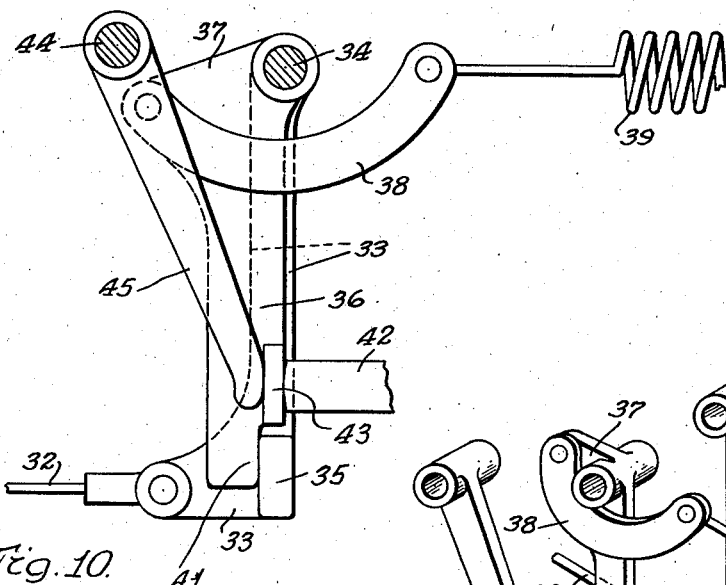
Fig. 10.
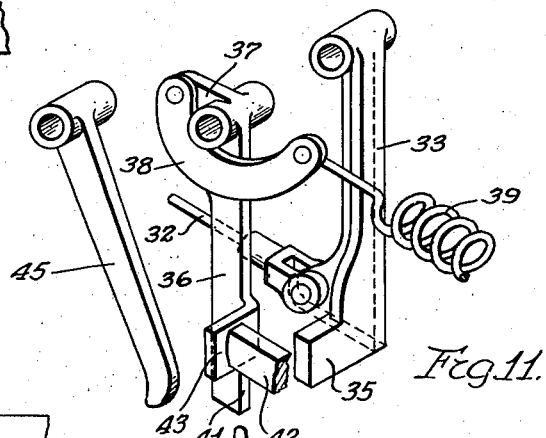
Fig. 11.
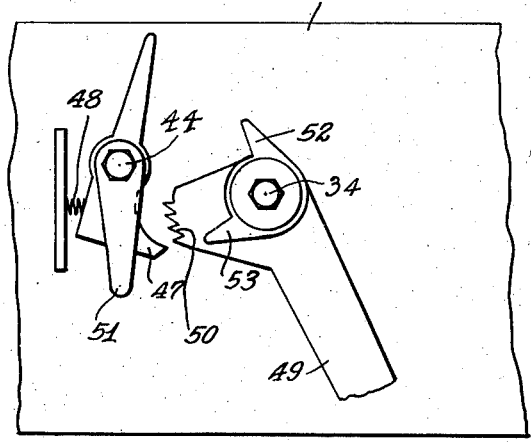
Fig. 12.
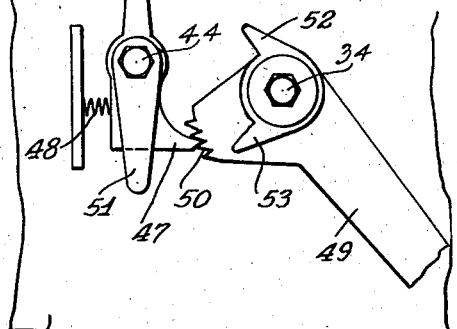
Fig. 13.
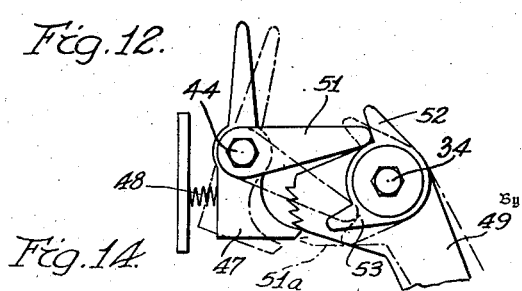
Fig. 14.
Inventor
Sidney B. Winn
By
Attorneys Patented Feb. 25, 1941

2,232,897

UNITED STATES PATENT OFFICE 2,232,897

TRACTOR TRAILER COUPLING MECHANISM

Sidney B. Winn, Lapeer, Mich.

Application January 3, 1938, Serial No. 183,072

14 Claims. (Cl. 280—33.1)

The present invention relates to tractor and semi-trailer combinations and has for an object to provide apparatus which operates automatically incident to coupling or uncoupling of the tractor from the trailer for actuating the trailer brakes and forward prop.

An important object of the invention is to provide a semi-trailer with fully automatic means operable incident to uncoupling of a tractor therefrom for applying the trailer brakes and maintaining them applied, for causing the prop to be lowered, and for locking the prop against retrograde movement while the trailer is uncoupled.

Another object is to provide means of the character above mentioned with fully automatic means operable incident to coupling of a tractor to the trailer for elevating the prop, locking the prop in an elevated position, and releasing the trailer brakes.

Another object of the invention is to provide a trailer with a king pin mounting means whereby the king pin moves forwardly during the uncoupling operation and rearwardly during the coupling operation and mechanism associated therewith and operated by such movements for lowering and elevating the prop and for applying and releasing the brakes.

Another object is to provide means for locking the king pin against forward movement when it is in a position holding the prop elevated and the brakes released, and to provide means for locking the king pin against rearward movement when the prop is lowered whereby to hold the prop lowered. The prop holding means is designed to hold the prop against retrograde movement whether it is fully or partly lowered in order to permit uncoupling upon irregular surfaces.

Another object of the invention is to provide, in combination with a forwardly and rearwardly movable king pin, brake actuating means for normally applying and holding the brakes applied, and means operated by movement of the king pin for rendering the brake actuating means operative or inoperative incident to uncoupling and coupling operations. The brake actuating means comprises a system of levers and resilient means normally acting on the levers in a direction to apply the brakes, and means operated by the king pin is positioned as a result of the coupling operation to hold the spring ineffective and when uncoupled to render the spring means effective to apply the brakes. In addition to the automatic means for operating the brakes, manual means is provided for applying and releasing the brakes and for locking the brake actuating means in either the brake applying or brake releasing positions.

With the above and other ends in view, the invention is more fully disclosed with reference to the accompanying drawings, in which Figure 1 is a fragmental side view of a coupled tractor and trailer, the trailer being shown in vertical section;

Fig. 2 is a fragmental view of the trailer;

Fig. 5 is a section taken on the line 5—5 of Fig. 3;

Fig. 6 is a section taken on the line 6—6 of Fig. 4;

Fig. 7 is a section taken on the line 7—7 of Fig. 3;

Fig. 8 is a section similar to Fig. 5, illustrating the lock released, prior to movement of the king pin;

Fig. 9 is a section taken on the line 9—9 of Fig. 4;

Fig. 10 is a fragmental section, illustrating the brake actuating levers;

Fig. 11 is an exploded perspective view of the brake actuating levers, and

Figs. 12, 13 and 14 are elevations illustrating different positions of a detail.

Like characters of reference are employed throughout to designate corresponding parts.

Figure 3:
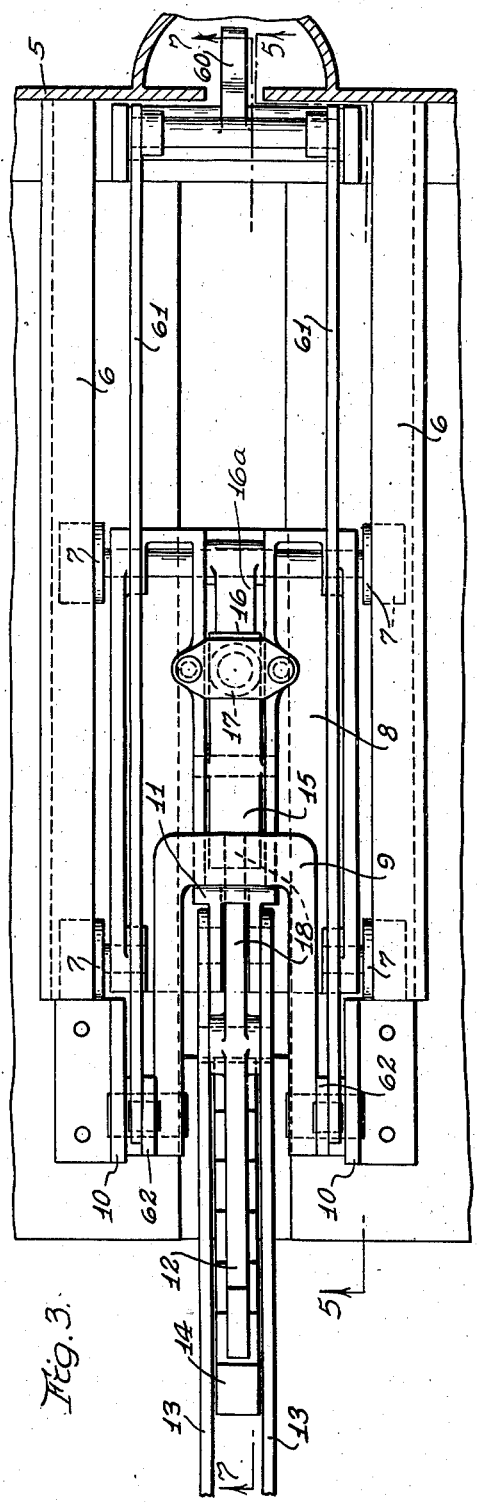
Figs. 3 and 4 are fragmental plan views, illustrating coupled and uncoupled positions respectively.
Figure 4:
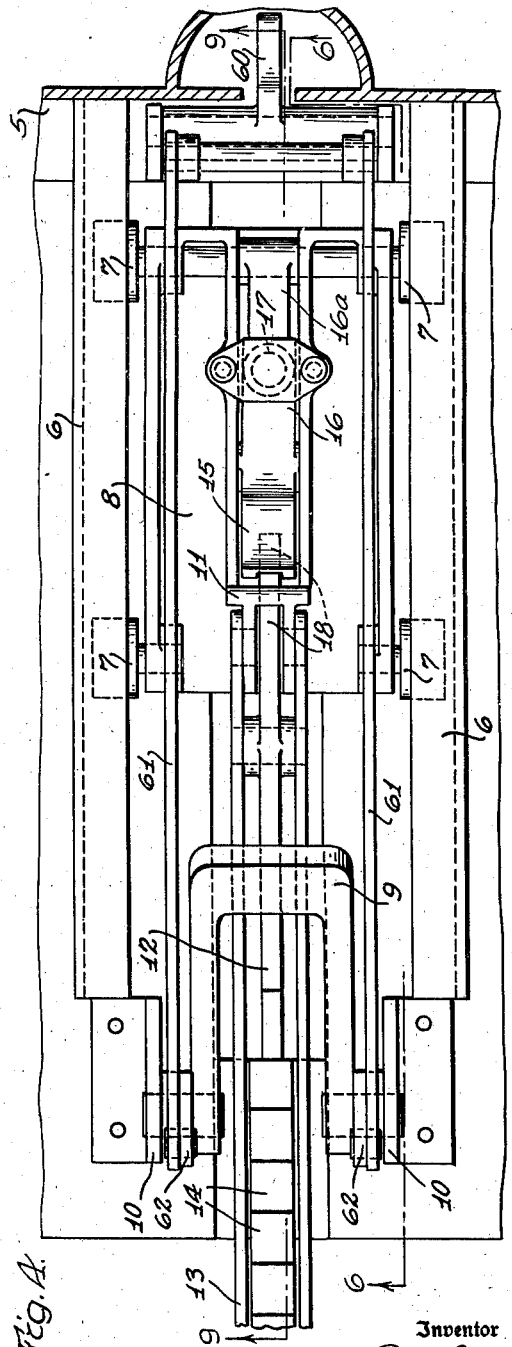

A tractor 1 has the usual fifth wheel 2 pivotally mounted thereon, the fifth wheel having a slot 3 (Figs. 7 and 8) for the reception of a king pin 4 carried by the trailer 5. When the tractor and trailer are coupled, mechanism carried by the fifth wheel locks the king pin in the slot 3. This invention relates to the mounting means for the king pin and mechanisms associated therewith on the trailer for performing certain service operations, and the means for locking the king pin in the slot 3 has not been illustrated inasmuch as it forms no part of the invention.

Mounted upon the forward end of the trailer 5 are two parallel channel guides 6 receiving the rollers 7 which carry the king pin supporting block 8. The block 8 is movable forwardly and rearwardly of the trailer in its guides 6 and is adapted to be locked in its rearmost position against forward movement, and also in its forward position, or any stage between its rearmost position and its forward position, against rearward movement. The means for locking the block in its rearmost position, as shown in Figs. 1, 3, 5 and 7 comprises a U-shaped locking member 9 pivoted upon brackets 10 whereby it may be swung into engagement with a vertical stud 11 on the block 8. The U-shaped locking member 9 is so mounted that it falls by force of gravity into engagement with the stud 11, when the block 8 is in its rearmost position, to prevent forward movement of the block. The means for preventing rearward movement of the block 8 comprises a pawl 12 pivoted between two bars 13, which are attached to the block 8 and extend rearwardly of the trailer, the pawl 12 being adapted to engage any one of a lengthwise extending series of ratchet teeth 14. The pawl 12 is mounted whereby it falls by force of gravity into engagement with the teeth 14.

Mounted in the block 8 is a rocking lever 15, one end of which extends beneath the locking member. The other end 16 of the rocking lever has a spring 17 connected thereto which acts thereon to rock said lever in a direction to elevate the locking member 9. A cam-like lever 16a extends under the rocking lever end 16 and when the tractor is coupled to the trailer, the fifth wheel 2 engages the cam-like lever 16a and causes it to rock the lever 15 to a position (see Fig. 7) permitting the locking member 9 to engage the stud 11, and thereby maintains the spring 17 compressed. When the fifth wheel moves away from the king pin, as it does in uncoupling, the cam-like lever 16a rides off the top surface of the fifth wheel and the rocking lever 15 moves very rapidly, as a result of the high spring pressure, from the position shown in Fig. 7 to that shown in Figs. 8 and 9. Such movement of the lever snaps the locking member 9 out of engagement with the stud 11 and thereby releases the block 8 whereby it may move forwardly.

The rocking lever 15 also engages an arm 18 on the pawl 12 and maintains the pawl 12 elevated, with respect to the teeth 14, when the tractor and trailer are coupled as shown in Fig. 7. When the rocking lever 15 is moved, as shown in Figs. 6, 8 and 9, the arm 18 is released and the pawl 12 is permitted to fall into engagement with the teeth 14.

Adjacent to the forward end of the trailer is pivotally mounted a prop 19, adapted when lowered to support the forward end of the trailer, when the latter is uncoupled from the tractor. The forward and rearward movements of the king pin block 8, above described, are utilized to elevate and lower the prop 19. To this end, a cross shaft 20 is provided with rollers 21 on opposite ends thereof which are received in channel guides 22, and the shaft 20 is connected to the prop 19 by links 23. The parallel bars 13 are connected to a bar or bars 13a which is connected at 24 to a notched arm 25 pivoted upon the shaft 20. When the bar 13a is moved rearwardly it tips the arm 25 upwardly and pushes the shaft 20 and links 23 rearwardly to elevate the prop, as shown in Fig. 1. When prop lowers, the bar 13a moves forwardly, as shown in Fig. 2, and the arm 25 tips forwardly whereby it engages a rigid element 26, and thereby lowers and locks the prop in a lowered position.

The free wheels of the trailer are equipped, as usual, with brakes. One of the brakes 27, is shown in Fig. 2, and it will be understood that both brakes are connected, as by the link 28 and arm 29 to a rotatable shaft 30. A single arm 31 rigid on the shaft 30 is connected by a link 32 to an arm 33 which is rigidly mounted on a transversely extending rotatable shaft 34. The arm 33 has a laterally extending lug 35.

Loosely mounted on the shaft 34 is a lever 36 having an integral arm 37 with a curved link 38 connected thereto. To the free end of the link 38 is connected a tension spring 39 and the other end of the spring is connected by tension adjusting means 39a to a rigid transverse member 40. The spring 39 normally urges swinging movement of the lever 36 about the shaft 34 whereby its end 41 engages the laterally extending lug 35 and swings the arm 33 in a direction to apply the brakes. An extension 42 is provided on the locking member 25 which engages a lug 43 on the lever 36, when the block 8 is in or near its rearmost position, to swing the lever 36 in opposition to the pressure of the spring 39 whereby the usual brake shoe retracting springs (not shown) may release the brakes.

Adjacent and parallel to the shaft 34 is a rotatable shaft 44 having an arm 45 rigidly mounted thereon and adapted to engage the lug 43 on the lever 36. Externally of the trailer frame member 46 the shaft 44 carries a pawl 47 and a spring 48 acts upon the pawl to urge rotation of the pawl and shaft 44 and thereby maintains the arm 45 in contact with the lug 43. Also externally of the trailer frame 46 the shaft 34 has an actuating lever 49 with ratchet teeth 50 thereon.

As shown in Fig. 12, the mechanism is positioned whereby the brakes are released, the lever 36 being held in its rearmost position by the extension 42, and the lug 43 holding the arm 45 in a position wherein the pawl 47 is spaced from the path of movement of the ratchet teeth 50. When the extension 42 is withdrawn from contact with the lug 43, the lever 36 is swung forwardly by the spring 39, and the spring 48 urges the pawl 47 to the position shown in Fig. 13, wherein it engages the ratchet teeth to hold the lever 36 against retrograde movement.

A dog 51 is pivoted concentric with the pawl 47 and is adapted to be manually moved into engagement with lugs 52 and 53 on the lever 49 to prevent rotation of the shaft 34. With the lever 49 positioned as shown in Fig. 14, the dog 51 may be placed in engagement with the lug 52 to hold the shaft 34 against movement in a direction causing brake application. In other words, the dog positioned as here indicated prevents application of the brakes. When positioned in engagement with the lug 53, as indicated at 51a in Fig. 14, the dog 51 holds the brakes applied.

As shown in Figs. 1, 3, 5 and 7, the tractor is coupled to the trailer, the king pin block 8 is in its rearmost position and is positively held in this position by the locking member 9. The extension 42 is in engagement with the lug 43 and the brakes are thereby held released. Assuming, for an understanding of the uncoupling operation, that the king pin holding means on the fifth wheel 2 is released to permit uncoupling, the tractor is moved. It will be noted that the pressure of the spring 39 and also the weight of the pivoted prop 19 are acting on the bar 13a in a manner to advance the king pin sliding block 8. Thus, when the tractor is moved and the fifth wheel 2 advances until the cam-like lever 16a registers with the slot 3, the lever 15 is actuated by the spring 17 to snap the locking member 9 from engagement with the stud 11, as shown in Fig. 8, so that the pressure of the spring 39 and the weight of the prop 19 initiate forward movement of the king pin block 6. The brakes are thus applied and the prop 19 lowered until it contacts the ground or assumes the position where it is fully lowered as shown in Fig. 2. The pawl 12, being released simultaneously with the lock 9, engages one of the teeth 14 to hold the block 8 and the prop 19 against retrograde movement. The pawl 12, it will be noted, holds the prop against retrograde movement whether the prop is fully lowered or not and it is possible, therefore to uncouple on irregular surfaces.

If, during uncoupling as above described, the friction is great enough to cause movement of the tractor with the trailer, the brakes may be manually applied by means of the lever 49.

Should the release of the locking member 9 fail to result from the pressure of the spring 17, a lever 60 is engaged by the fifth wheel 2 and is rocked to impart movement to the links 61 which are connected to arms 62 on the locking member 9. A spring 61a acts upon the links 61 to hold the lever 60 in its normal position. This movement positively initiates movement of the locking member and overcomes any friction which might prevent movement by the pressure of the spring.

With the tractor and trailer uncoupled, the forward end of the trailer is supported by the prop 19. As the tractor is again backed under the trailer, in the coupling operation, the fifth wheel strikes the cam-like lever 16a and the latter rocks the lever 15 whereby it engages the arm 18 and elevates the pawl 12. The locking member 9 is at this time riding on the bars 13 and the block 8 is free to move rearwardly. Continued movement of the tractor causes engagement of the end of the slot 3 with the king pin 4 and the block 8 is moved rearwardly, thereby causing the prop 19 to be elevated.

During the coupling operation the brakes are held applied by the pawl 47 until such time as the latter is released by operation of the arm 45, caused by swinging movement of the lever 36 when its lug 43 is engaged by the extension 42. At the time the pawl 47 is released, the stud 11 is positioned whereby the locking member 9 falls into locking engagement therewith.

The type of prop here shown is well known to the art, but in the instant case the locking pawl 12 cooperates in a novel manner therewith. As shown in Fig. 2 the locking member 25 is in a locked position and cannot be released without moving the element 13a rearwardly. The element 13a cannot move rearwardly at this time because the pawl 12 is operative to prevent rearward movement of the links 13. It will be seen that the pawl 12 is adapted for releasably holding the member 25 in a locked position. This function is important inasmuch as during coupling of the tractor to the trailer the locking member 25 is held locked until the fifth wheel engages the cam-like lever 16a and through rocking the rocking lever 15 raises the pawl 12. The coupling operation is almost completed, therefore, before the kin pin block is moved to elevate the prop and the brakes will remain applied until coupling has been completed.

As a result of the locking function referred to immediately above it is impossible to elevate the prop unless the king pin enters the slot in the fifth wheel. If the king pin rides on top of the fifth wheel the cam-like lever 16a cannot be actuated and the king pin remains locked against movement relative to its guides.

Although a specific embodiment of the invention has been illustrated and described it will be understood that various changes may be made within the scope of the appended claims without departing from the spirit of the invention and such changes are contemplated.

What I claim is:

1. In combination with a trailer adopted to have a tractor coupled thereto, a king pin, means mounting said king pin on said trailer for movement rearwardly and forwardly thereof, a prop mounted on said trailer and adapted to be elevated and lowered, means connecting said prop to said king pin whereby rearward movement of the king pin caused by coupling the tractor to the trailer elevates said prop, and whereby the weight of said prop moves said king pin forwardly during uncoupling of the tractor from the trailer, locking means for holding said king pin in its rearmost position with said prop elevated, and means operable incident to uncoupling of the tractor from the trailer for moving said locking means to an inoperative position.

2. In combination with a trailer adapted to have a tractor coupled thereto, a king pin, means mounting said king pin on said trailer for movement rearwardly and forwardly thereof, a prop mounted on said trailer and adapted to be elevated and lowered, means connecting said prop and said king pin mounting means whereby rearward movement of said mounting means caused by coupling the tractor to the trailer elevates said prop, and whereby the weight of said prop moves said king pin mounting means forwardly during uncoupling of the tractor from the trailer, means for locking said prop against retrograde movement after it has been lowered, said last named means being movable with said king pin mounting means and being adapted to hold said prop against retrograde movement during any stage of its lowering movement, locking means for holding said king pin mounting means in its rearmost position and with the prop elevated, and means on the trailer operated incident to the coupling of a tractor to said trailer for rendering the first locking means inoperative and the second locking means operative.

3. In combination with a trailer adapted to have a tractor coupled thereto, a king pin, means mounting said king pin on said trailer for movement rearwardly and forwardly thereof, a prop mounted on said trailer and adapted to be elevated and lowered, means connecting said prop to said king pin whereby rearward movement of the king pin caused by coupling the tractor to the trailer elevates said prop, and whereby the weight of said prop moves said king pin forwardly during uncoupling of the tractor from the trailer, locking means for holding said king pin in its rearmost position, means for rendering said locking means inoperative incident to the coupling of a tractor to the trailer, and means for holding the locking means in an inopertive position when said king pin is in any position other than its rearmost position.

4. In combination with a trailer adapted to have a tractor coupled thereto, a king pin, means mounting said king pin on said trailer for movement rearwardly and forwardly thereof incident to the coupling of a tractor to said trailer and the uncoupling of the tractor respectively, a prop mounted on said trailer and adapted to be elevated and lowered, means connecting the king pin mounting means and prop whereby elevation of the prop accompanies rearward movement and lowering of the prop accompanies forward movement of said mounting means, means for locking the king pin mounting means in a position holding the prop fully elevated, means on said mounting means for locking said mounting means against movement in a direction permitting elevation of the prop when the king pin is in any position other than the first mentioned locked position, and means operable incident to coupling and uncoupling of a tractor to said trailer for controlling the operation of both locking means, said last named means being adapted to render the first locking means inoperative and the second locking means operative during the initial stage of uncoupling movement.

5. In combination with a trailer having a prop adapted to be raised and lowered, king pin mounting means at the forward end of said trailer and adapted for movement in a direction forwardly and rearwardly of the trailer, said king pin of said mounting means being adapted to have a tractor coupled thereto, means connecting said king pin mounting means to said prop whereby said mounting means moves incident to elevation and lowering of the prop, means for locking the king pin mounting means in its rearmost position to prevent its movement in a direction permitting lowering of the prop, ratchet means on said mounting means to hold said mounting means against retrograde movement during its forward movement and to hold said prop in any position to which it is lowered, and spring means for releasing said locking means, said spring means and said ratchet means being rendered inoperative when a tractor is coupled to the king pin.

6. In apparatus of the character described, and in subcombination, a trailer frame, a king pin block having a king pin thereon, means supporting said king pin block for movement relative to the trailer frame, a locking member adapted to engage said block when it is in one position to hold it against movement in one direction, and spring actuated means adapted to be rendered operative and inoperative, said spring actuated means being adapted when rendered operative to snap said locking member from engagement with said block.

7. In apparatus of the character described, and in subcombination, a trailer frame, a king pin block having a king pin thereon, means supporting said king pin block for movement relative to the trailer frame, a locking member pivoted for upward swinging movement and adapted to engage said block to hold it against movement in one direction, a rocking lever with one end engaged beneath said locking member, a spring acting on the other end of said lever to quickly release said locking member from said block upon release of said spring, and means to hold said lever with said spring compressed when said tractor and trailer are in coupled position and to release said spring to quickly operate said lever upon uncoupling movement.

8. In apparatus of the character described, and in sub combination, a trailer frame, a king pin block having a king pin thereon, means supporting said king pin block for movement relative to the trailer frame, a locking member adapted to engage said block when it is in one position to hold it against movement in one direction, a rocking lever having one end operatively associated with said locking member, spring means for moving said lever in one direction, positive means moved by a coupling movement of tractor and trailer for moving said lever in the other direction, and ratchet means for progressively holding said block when released by said locking means, said ratchet means being held inoperative by said lever while said lock is operated and released by said lever when said lever is operated by said spring.

9. In apparatus of the character described, and in subcombination, a trailer frame, a king pin block having a king pin thereon, means supporting said king pin block for movement relative to the trailer frame, a locking member adapted to engage said block when it is in one position to hold it against movement in one direction, a rocking lever having one end operatively associated with said locking member, a spring acting on the other end of said lever and adapted to rock the same to release said locking member, means for moving and holding said lever against the pressure of said spring, a second rocking lever, and a link connecting the second lever with said locking member.

10. In a vehicle, supporting means, means carried by said supporting means and movable relative thereto, coupling means carried by said movable means, said movable means having a latch member, a locking member arranged to descend by gravity into holding relation with said latch member, means operable to snap said locking member out of engagement with said latch member, and releasable means operable to restrain said operable means.

11. In a vehicle, supporting means, means carried by said supporting means and movable relative thereto, coupling means carried by said movable means for coupling the vehicle to a second vehicle, locking means for locking said movable means including a U-shaped member arranged to descend by gravity into locking position, and spring means acting to snap said U-shaped member to an ineffective position and operable upon uncoupling of the vehicles.

12. In a trailer vehicle for automatic coupling to a tractor vehicle, a frame, a movable member carried by one of the vehicles and movable relative thereto by the coupling action of the vehicles, means to couple said member to the other of the vehicles, a prop for said trailer frame, said prop having a raised position and a lowered ground engaging position and operatively connected to said member, said movable member controlling lowering of said prop, releasable means for locking said prop and said frame together against relative movement irrespective of the position of the prop in its range of movement and controlled by said movable member and means operable by movement of the tractor away from the trailer for positively actuating said releasable means to unlock said prop.

13. In a semi-trailer vehicle for coupling with a tractor, a frame having rear ground engaging wheels, a prop for the frame and having a raised position and having a lowered ground engaging position, means operable to raise said prop, means operable for releasably locking said prop in raised position, means operable to actuate said releasable locking means to unlock said prop, and safety means operable by the tractor upon separation of the vehicles for positively actuating said releasable locking means to unlock said prop.

14. In a semi-trailer vehicle for coupling with a tractor vehicle, a frame supported by rear wheels, a prop for the frame and having a raised position and having a lowered ground engaging position, means for raising and lowering said prop, means for locking said prop in raised position, a lever arranged for engagement and actuation by the tractor upon separation of the vehicles for positively releasing said prop locking means, a link member operatively connecting said locking means and said lever, and yieldable means acting to hold said lever in position for engagement by the tractor.

SIDNEY B. WINN.